(12) United States Patent
Hayasaka et al.

(10) Patent No.: US 7,684,914 B2
(45) Date of Patent: Mar. 23, 2010

(54) COLLISION DETERMINING APPARATUS FOR A VEHICLE

(75) Inventors: Masatoshi Hayasaka, Shioya-gun (JP); Fang Yuan, Kawachi-gun (JP); Tatsuji Oosaki, Utsunomiya (JP)

(73) Assignee: Keihin Corporation, Shinjuku-Ku, Tokyo (JP)

( * ) Notice: Subject to any disclaimer, the term of this patent is extended or adjusted under 35 U.S.C. 154(b) by 0 days.

(21) Appl. No.: 11/230,469

(22) Filed: Sep. 21, 2005

(65) Prior Publication Data
US 2006/0069483 A1      Mar. 30, 2006

(30) Foreign Application Priority Data
Sep. 24, 2004   (JP)   ............... 2004-277692

(51) Int. Cl.
B60R 21/00   (2006.01)
B60R 22/00   (2006.01)
G08G 1/16   (2006.01)

(52) U.S. Cl. ............... 701/45; 701/46; 701/47; 701/301; 180/268; 180/271; 280/734

(58) Field of Classification Search ............. 701/45–47, 701/301; 180/268, 271; 280/734
See application file for complete search history.

(56) References Cited

U.S. PATENT DOCUMENTS

| | | | |
|---|---|---|---|
| 5,189,311 A | | 2/1993 | Moriyama et al. |
| 5,301,772 A | * | 4/1994 | Honda .................. 180/268 |
| 5,540,461 A | * | 7/1996 | Nitschke et al. ......... 280/735 |
| 5,835,007 A | * | 11/1998 | Kosiak ................. 340/436 |
| 5,969,599 A | * | 10/1999 | Wessels et al. .......... 340/436 |
| 6,018,980 A | * | 2/2000 | Kimura et al. .......... 73/12.04 |
| 6,036,225 A | * | 3/2000 | Foo et al. ............. 280/735 |
| 6,167,335 A | * | 12/2000 | Ide et al. ............. 701/45 |
| 6,246,937 B1 | * | 6/2001 | Miyaguchi et al. ....... 701/45 |
| 6,496,764 B1 | * | 12/2002 | Wang .................. 701/45 |

(Continued)

FOREIGN PATENT DOCUMENTS

EP    0 727 336 A1    8/1996

(Continued)

OTHER PUBLICATIONS

Japanese Office Action, Japanese Application No. JP2004-277692, Mailing Date: Sep. 9, 2008, pp. 1-3, English Translation: pp. 1-3.

*Primary Examiner*—Jack W. Keith
*Assistant Examiner*—Chuong P Nguyen
(74) *Attorney, Agent, or Firm*—Squire, Sanders & Dempsey L.L.P.

(57) ABSTRACT

A collision determining apparatus for a vehicle includes: a first acceleration measuring device; a second acceleration measuring device; a movement amount calculating device; a change in movement speed calculating device; a first collision determining threshold value setting device which sets a collision determining threshold value for a correlation between the amount of movement of the occupant and the change in movement speed of the occupant based on the acceleration which is measured by the first acceleration measuring device; a first collision determining device which determines whether or not the correlation exceeds the collision determining threshold value; and a control signal generating device which generates a control signal which controls operations of an occupant protection apparatus, in accordance with a result of a determination by the first collision determining device.

8 Claims, 8 Drawing Sheets

U.S. PATENT DOCUMENTS

| | | |
|---|---|---|
| 6,512,969 B1 | 1/2003 | Wang |
| 6,516,259 B2 * | 2/2003 | Morell et al. .................. 701/45 |
| 6,636,794 B2 * | 10/2003 | Yamashita .................. 701/46 |
| 6,729,646 B1 | 5/2004 | Morell |
| 6,816,767 B2 * | 11/2004 | Hayasaka et al. ............. 701/47 |
| 2003/0127271 A1 * | 7/2003 | Hayasaka et al. ........... 180/274 |
| 2003/0155754 A1 * | 8/2003 | Komaki et al. .............. 280/735 |

FOREIGN PATENT DOCUMENTS

| | | | |
|---|---|---|---|
| EP | 0818357 | * | 3/1998 |
| EP | 1 323 592 A1 | | 7/2003 |
| JP | H3-253441 | | 11/1991 |
| JP | 4287746 (A) | | 10/1992 |
| JP | 10-152014 | | 6/1998 |
| JP | 10-287203 | | 10/1998 |
| JP | 10287203 | * | 10/1998 |
| JP | 10-315907 | | 12/1998 |
| JP | 11-078990 | | 3/1999 |
| JP | 11-078999 | | 3/1999 |
| JP | 2000-079865 | | 3/2000 |
| JP | 2001-138856 | | 5/2001 |
| JP | 2001-278000 | | 10/2001 |
| JP | 2003-191817 | | 7/2003 |
| WO | WO 2005/061281 A1 | | 7/2005 |

* cited by examiner

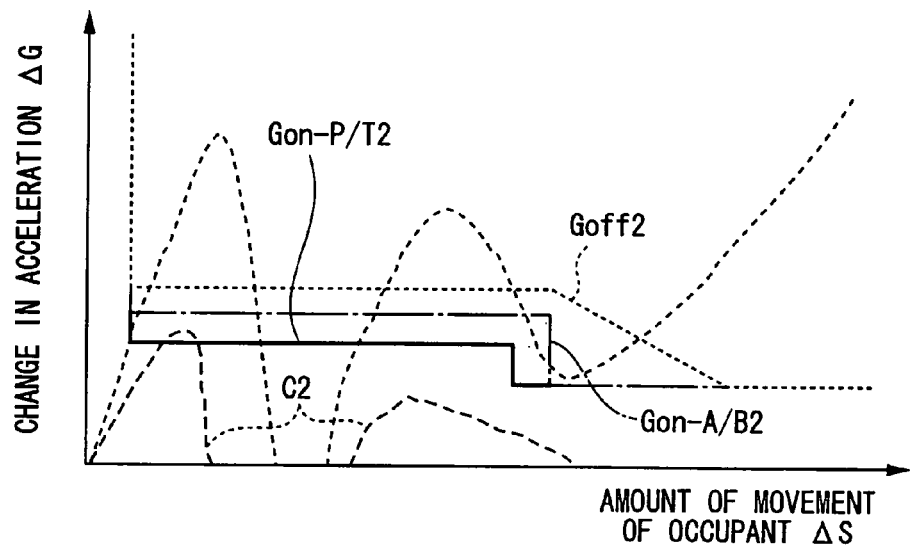
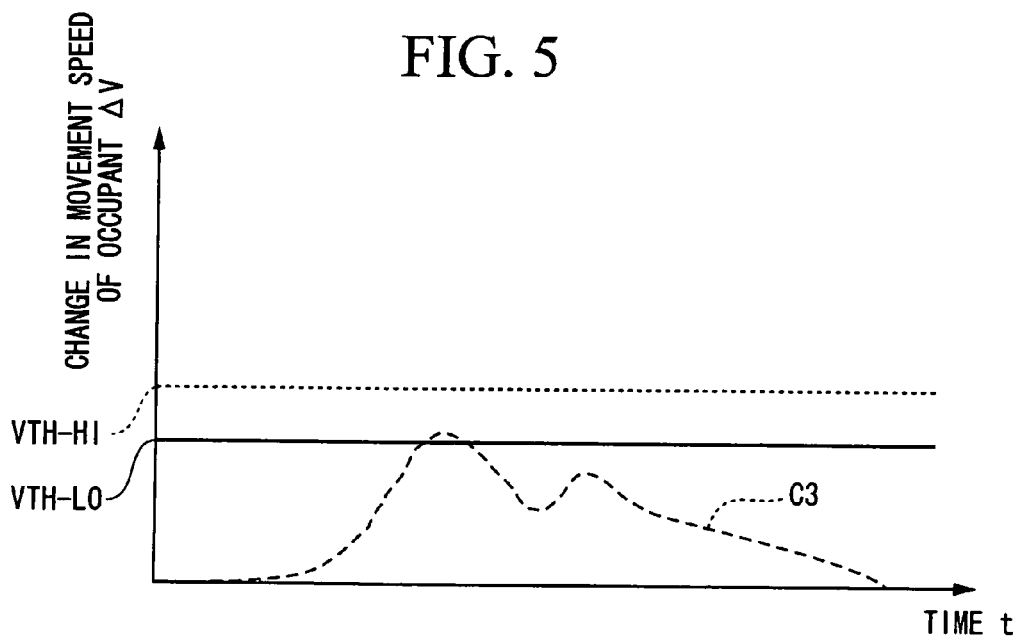

COLLISION DETERMINING APPARATUS FOR A VEHICLE

BACKGROUND OF THE INVENTION

1. Field of the Invention

The present invention relates to a collision determining apparatus for a vehicle that determines a vehicle collision, and causes an occupant protection apparatus such as, for example, an airbag apparatus or a seatbelt pretensioner to be operated.

Priority is claimed on Japanese Patent Application No. 2004-277692, filed Sep. 24, 2004, the contents of which are incorporated herein by reference.

2. Description of Related Art

Conventionally, collision determining apparatuses for vehicles are known that are provided with acceleration sensors that, for example, detect the acceleration (or the rate of deceleration) that is applied to a vehicle. These apparatuses detect change in acceleration of a vehicle using acceleration signals that are output from the acceleration sensor, and perform temporal primary integration or temporal secondary integration on the acceleration signals. When these integral values exceed predetermined respective threshold values, an occupant protection apparatus such as, for example, an airbag apparatus or a seatbelt pretensioner is operated.

When it is determined by this type of collision determining apparatus for a vehicle that the vehicle is in a collision, the airbag apparatus, for example, ignites a gas generating agent inside an inflator using a squib so that gas is generated by the inflator. The airbag is then inflated by this gas so as to control any secondary collision between an occupant and components inside the vehicle interior (see, for example, Japanese Unexamined Patent Application, First Publication No. 2003-191817).

In a conventional collision determining apparatus for a vehicle such as that described above, it is necessary for the state of the collision to be determined in a short time from when the collision occurs, and for the operation of an occupant protection apparatus to then be controlled.

However, by simply altering the threshold value for the integral values of the acceleration signals that are output from the acceleration sensor to values that make it easy to determine a collision is occurred, the problem arises that the occupant protection apparatus ends up being operated even when the collision is not so severe as to require the occupant protection apparatus to be operated.

SUMMARY OF THE INVENTION

The present invention was conceived in view of the above described circumstances and it is an object thereof to provide a collision determining apparatus for a vehicle that can make an appropriate collision determination that corresponds to the state of a collision in a short period of time, and that can cause an occupant protection apparatus to be appropriately operated.

The collision determining apparatus for a vehicle of the present invention includes: a first acceleration measuring device which measures an acceleration acting on an outer peripheral portion of the vehicle; a second acceleration measuring device which measures an acceleration acting on a position further to an inner portion side of the vehicle than the first acceleration measuring device; a movement amount calculating device which calculates an amount of movement of an occupant based on the acceleration which is measured by the second acceleration measuring device; a change in movement speed calculating device which calculates a change in movement speed of the occupant based on the acceleration which is measured by the second acceleration measuring device; a first collision determining threshold value setting device which sets a collision determining threshold value for a correlation between the amount of movement of the occupant and the change in movement speed of the occupant based on the acceleration which is measured by the first acceleration measuring device; a first collision determining device which determines whether or not the correlation exceeds the collision determining threshold value; and a control signal generating device which generates a control signal which controls operations of an occupant protection apparatus, in accordance with a result of a determination by the first collision determining device.

According to the collision determining apparatus for a vehicle of the present invention, in accordance with the detection results from a first acceleration measuring device which has a relatively high detection sensitivity while detecting the occurrence of a collision, a collision determining threshold value is set for a correlation between an amount of movement of an occupant and a change in movement speed of an occupant based on detection results from a second acceleration measuring device. As a result, it is possible to ascertain accurately whether or not a collision is occurred as well as to ascertain the state of a collision which is occurred and also operate an occupant protection apparatus at an earlier timing compared with when the operation of the occupant protection apparatus is controlled based solely on detection results from the second acceleration measuring device.

In the collision determining apparatus for a vehicle of the present invention, it is preferable that the first collision determining threshold value setting device set a different collision determining threshold value for each one of a plurality of the occupant protection apparatuses.

According to the collision determining apparatus for a vehicle of the present invention, a plurality of different occupant protection apparatuses such as, for example, airbag apparatuses and seatbelt pretensioners and the like can be made to operate appropriately.

The collision determining apparatus for a vehicle of the present invention includes: a first acceleration measuring device which measures an acceleration acting on an outer peripheral portion of the vehicle; a second acceleration measuring device which measures an acceleration acting on a position further to an inner portion side of the vehicle than the first acceleration measuring device; a movement amount calculating device which calculates an amount of movement of an occupant based on the acceleration which is measured by the second acceleration measuring device; a change in acceleration calculating device which calculates a change in acceleration based on the acceleration which is measured by the second acceleration measuring device; a second collision determining threshold value setting device which sets a collision determining threshold value for a correlation between the amount of movement of the occupant and the change in acceleration based on the acceleration which is measured by the first acceleration measuring device; a second collision determining device which determines whether or not the correlation exceeds the collision determining threshold value; and a control signal generating device which generates a control signal which controls operations of an occupant protection apparatus, in accordance with a result of a determination by the second collision determining device.

According to the collision determining apparatus for a vehicle of the present invention, in accordance with the detection results from a first acceleration measuring device which has a relatively high detection sensitivity when detecting the occurrence of a collision, collision determining threshold values are set for a correlation between an amount of movement of an occupant and a change in acceleration based on detection results from a second acceleration measuring device. As a result, it is possible to ascertain accurately whether or not a collision is occurred as well as to ascertain the state of a collision which is occurred and also operate an occupant protection apparatus at an earlier timing compared with when the operation of the occupant protection apparatus is controlled based solely on detection results from the second acceleration measuring device.

In the collision determining apparatus for a vehicle of the present invention, it is preferable that the second collision determining threshold value setting device set a different collision determining threshold value for each one of a plurality of the occupant protection apparatuses.

According to the collision determining apparatus for a vehicle of the present invention, a plurality of different occupant protection apparatuses such as, for example, airbag apparatuses and seatbelt pretensioners and the like can be made to operate appropriately.

The collision determining apparatus for a vehicle of the present invention, it is preferable that the collision determining apparatus include a change in movement speed calculating device which calculates a change in movement speed of the occupant based on the acceleration which is measured by the second acceleration measuring device, and a collision stability determining device which determines whether or not the change in movement speed of the occupant is within a predetermined collision determination area, wherein the control signal generating device generates a control signal which controls operations of an occupant protection apparatus in accordance with a result of a determination by the second collision determining device and a result of a determination by the collision stability determining device.

According to the collision determining apparatus for a vehicle of the present invention, it is possible to determine the severity of a collision which is occurred as well as the continuing state of the collision by determining whether or not a correlation between an amount of movement of an occupant and the change in acceleration exceeds a predetermined collision determining threshold value. Furthermore, by determining whether or not a change in movement speed of an occupant, in which, compared with a change in acceleration, for example, vibration and the like are suppressed and a relatively smooth change is exhibited, is within a predetermined collision determining area, it is possible to judge the stability and reliability of a collision determination and the occupant protection apparatuses can be made to operate even more appropriately.

In the collision determining apparatus for a vehicle of the present invention, it is preferable that the collision determining apparatus further include a collision determining area setting device which sets the collision determining area based on the acceleration which is measured by the first acceleration measuring device.

According to the collision determining apparatus for a vehicle of the present invention, a collision determining area is set for a change in movement speed of an occupant in accordance with the detection results from a first acceleration measuring device which has a relatively high detection sensitivity when detecting the occurrence of a collision. As a result, the stability and reliability of a collision determination can be improved.

BRIEF DESCRIPTION OF THE DRAWINGS

FIG. 4 is a view showing an example of collision determining threshold values on an S-G MAP.

FIG. 5 is a view showing an example of collision determining threshold values for a change in movement speed of an occupant $\Delta V$.

DETAILED DESCRIPTION OF THE INVENTION

An embodiment of the collision determining apparatus for a vehicle of the present invention will now be described with reference made to FIGS. 1 to 10.

Figure 1:
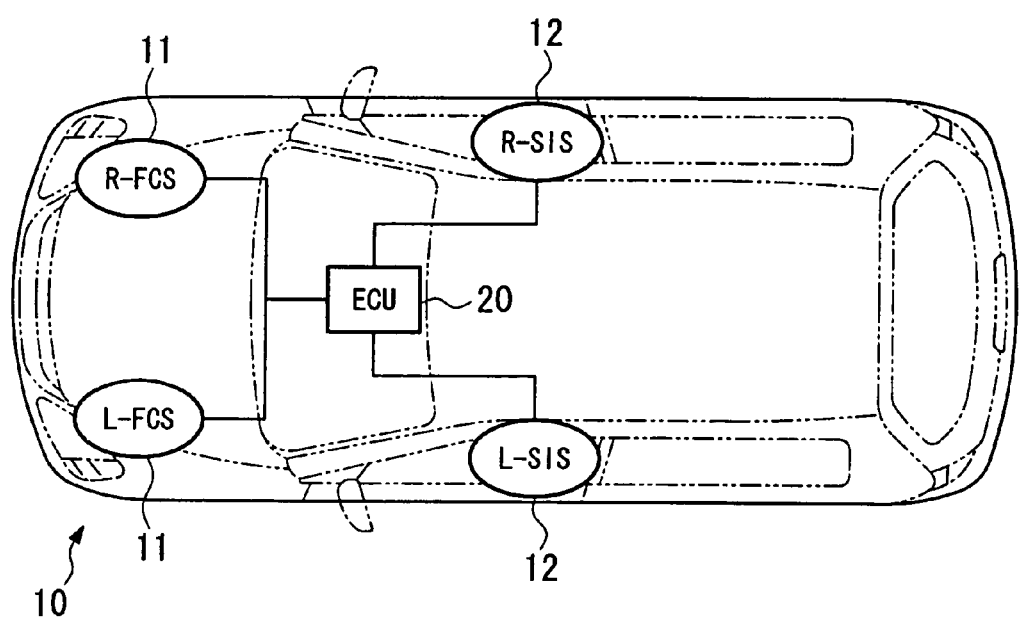
FIG. 1 is a view showing an embodiment of the collision determining apparatus for a vehicle of the present invention and is a schematic view of a vehicle equipped with the collision determining apparatus for a vehicle.

As shown in FIG. 1, a collision determining apparatus for a vehicle 10 of the present embodiment is provided with an electronic control unit (ECU) 20 that is located in the center of the vehicle and a plurality of satellite sensors. The satellite sensors are formed by a plurality of acceleration sensors, for example, two front crash sensors (first acceleration measuring device (i.e., L-FCS and R-FCS)) 11 that are located at a right front portion and a left front portion of the vehicle, and two side impact sensors (first acceleration measuring device (i.e., L-SIS and R-SIS)) 12 that are located at a right side portion and a left side portion of the vehicle. Acceleration signals that are output from the respective satellite sensors are input into the electronic control unit 20.

Figure 2:
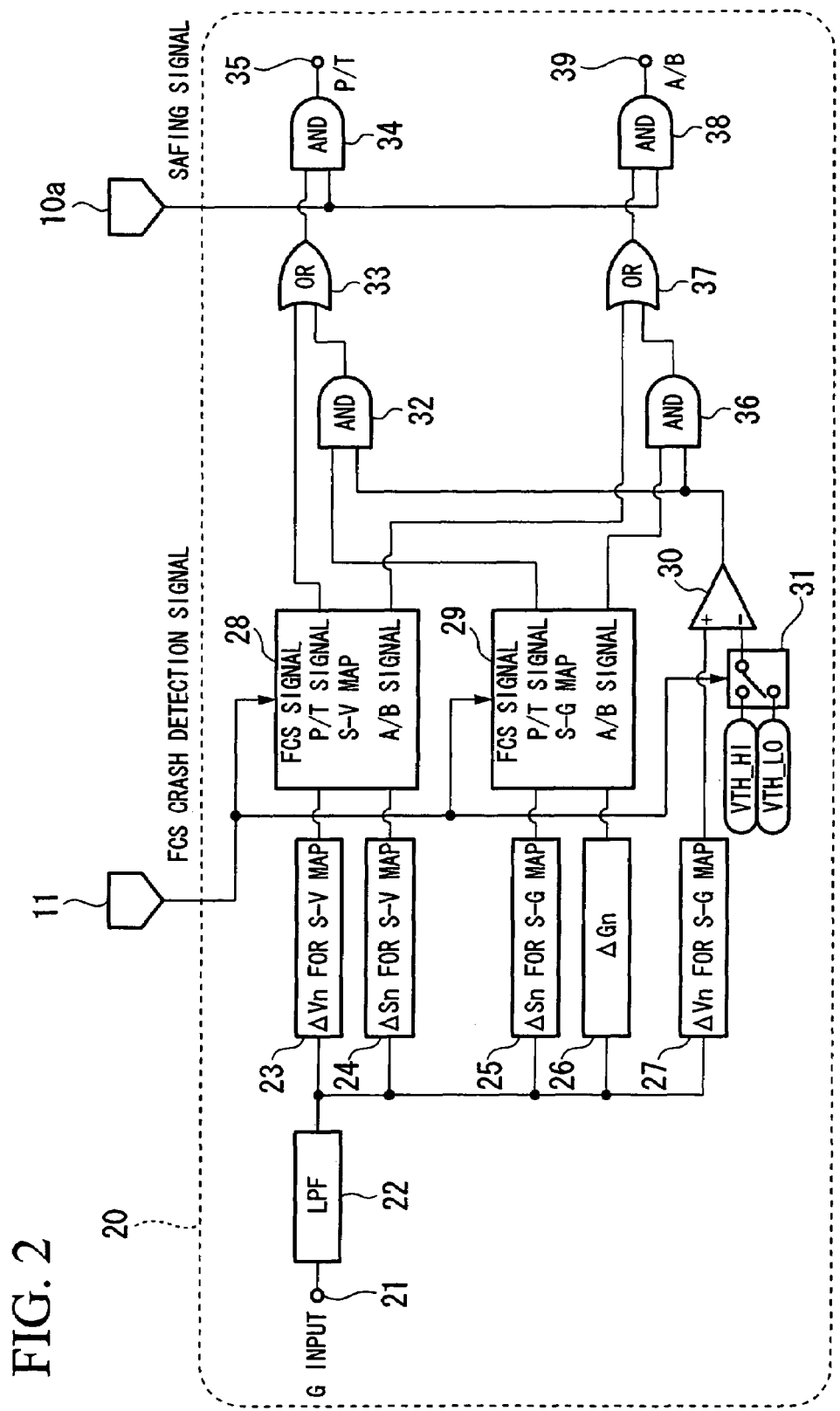
FIG. 2 is a block diagram of a collision determining apparatus for a vehicle.

As shown in FIG. 2, the electronic control unit 20 is provided with an acceleration sensor (second acceleration measuring device) 21, a filter processing section 22, a $\Delta Vn$ calculation section for SV (change in movement speed calculating device) 23, a $\Delta Sn$ calculation section for SV (movement amount calculating device) 24, a $\Delta Sn$ calculation section for SG (movement amount calculating device) 25, a $\Delta Gn$ calculation section (change in acceleration calculating device) 26, a $\Delta Vn$ calculation section for SG (change in movement speed calculating device) 27, an SV determination processing section (first collision determining threshold value setting device) 28, an SG determination processing section (second collision determining threshold value setting device) 29, a $\Delta Vn$ determination section for SG 30, a $\Delta Vn$ threshold value switching section (collision determining area setting device) 31, a P/T AND circuit 32, a P/T OR circuit 33, a safing AND circuit 34, a P/T startup signal generating section (control signal generating device) 35, an A/B AND circuit 36, an A/B OR circuit 37, a safing AND circuit 38, and an A/B startup signal generating section (control signal generating device) 39.

The acceleration sensor 21 outputs acceleration signals G at a voltage level that matches the size of an acceleration (or a rate of deceleration) acting, for example, in a longitudinal direction or transverse direction of a vehicle.

The filter processing section 22 is equipped with a low pass filter (LPF) that removes high frequency components, which are noise components, from the accelerations signals G that are output from the acceleration sensor 21.

The ΔVn calculation section for SV 23 performs a primary integration for time on the acceleration signals G that are output from the filter processing section 22, and, As shown below in Formula (1), for example, calculates a change in movement speed of an occupant ΔVn in a time interval having a predetermined time width n relative to the current time tp (i.e., tp−n≦t≦tp), and outputs the result to the SV determination processing section 28.

The ΔSn calculation section for SV 24 performs a secondary integration for time on the acceleration signals G that are output from the filter processing section 22, and, As shown below in Formula (2), for example, calculates an amount of movement of an occupant ΔSn in a time interval having a predetermined time width n relative to the current time tp (i.e., tp−n≦t≦tp), and outputs the result to the SV determination processing section 28.

$$\Delta Vn = \int_{tp-n}^{tp} G(t)dt \quad (1)$$

$$\Delta Sn = \iint_{tp-n}^{tp} G(t)dt \quad (2)$$

The ΔSn calculation section for SG 25 performs a secondary integration for time on the acceleration signals G that are output from the filter processing section 22, and, As shown above in Formula (2), for example, calculates an amount of movement of an occupant ΔSn in a time interval having a predetermined time width n relative to the current time tp (i.e., tp−n≦t≦tp), and outputs the result to the SG determination processing section 29.

The ΔGn calculation section 26 performs a primary integration for time on the acceleration signals G that are output from the filter processing section 22, and, As shown below in Formula (3), for example, calculates a difference between respective integral values (i.e., a change in acceleration) ΔGn in time intervals having different predetermined time widths n relative to the current time tp (i.e., tp−2n≦t≦tp−n and tp−n≦t≦tp), namely, calculates a temporal change in the integral values.

The ΔVn calculation section for SG 27 performs a primary integration for time on the acceleration signals G that are output from the filter processing section 22, and, As shown above in Formula (1), for example, calculates a change in movement speed of an occupant ΔVn in a time interval having a predetermined time width n relative to the current time tp (i.e., tp−n≦t≦tp), and outputs the result to the SGΔVn determination section 30.

$$\Delta Gn = \int_{tp-n}^{tp} G(t)dt - \int_{tp-2n}^{tp-n} G(t)dt \quad (3)$$

The SV determination processing section 28 sets, for a plurality of different occupant protection apparatuses such as, for example, airbags and seatbelt pretensioners, collision determination threshold values, which are boundary values of respective areas that specify whether an operation of a vehicle protection apparatus is allowed or not allowed, on an S-V MAP that shows a correlation between a change in movement speed of an occupant ΔV and the amount of movement of the occupant ΔS (for example, rectangular coordinates that take the amount of movement of an occupant ΔS as the horizontal axis and the change in movement speed of an occupant ΔV as the vertical axis) in accordance with whether or not a collision of a predetermined size is detected by the satellite sensors (for example, by the front crash sensors (L-FCS or R-FCS)11). In addition, the SV determination processing section 28 determines for each occupant protection apparatus whether or not the correlation between the change in movement speed of an occupant ΔVn that is input from the ΔVn calculation section for SV 23 and the amount of movement of the occupant ΔSn that is input from the ΔSn calculation section for SV 24 exceeds a predetermined collision determination threshold value. When, for example, it is determined that the collision determination threshold value for a seatbelt pretensioner is exceeded, a P/T signal having a true value of "1" is output to the P/T OR circuit 33. When it is determined that the collision determination threshold value for an airbag apparatus is exceeded, an A/B signal having a true value of "1" is output to the A/B OR circuit 37.

Figure 3:
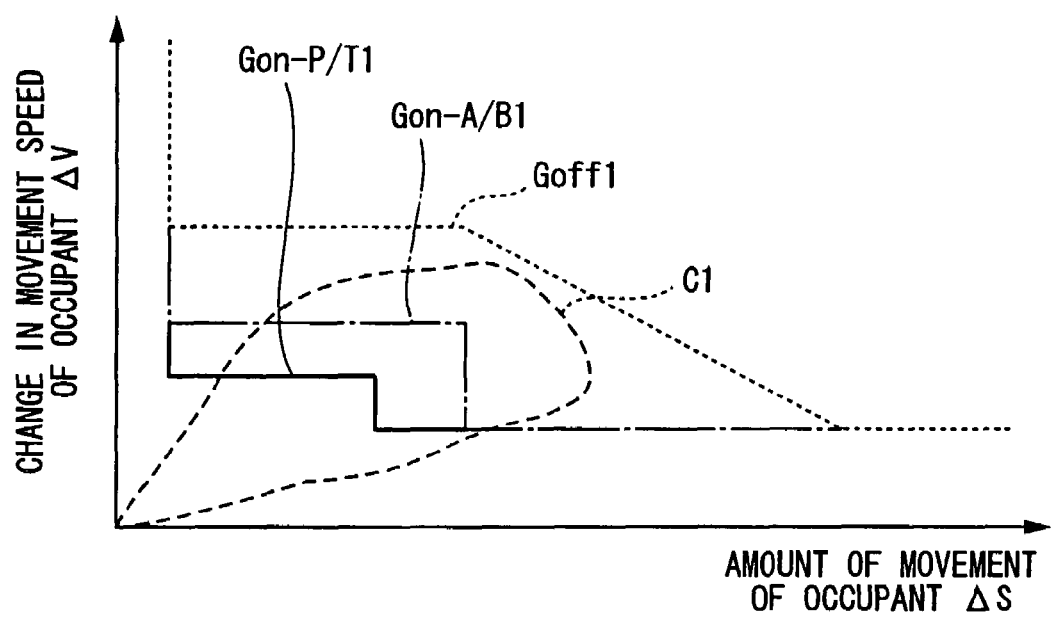
FIG. 3 is a view showing an example of collision determining threshold values on an S-V MAP.

For example, on the S-V MAP shown in FIG. 3, when a collision of a predetermined size is not detected by the front crash sensor 11, a collision determining threshold value Goff1 (for example, the dotted line Goff1 shown in FIG. 3) that specifies whether operations of an airbag apparatus and a seatbelt pretensioner are to be allowed or not allowed is set to a value that specifies that operations of the airbag apparatus and the seatbelt pretensioner are to be allowed in an area where at least the change in movement speed of an occupant ΔV or the amount of movement of the occupant ΔS is a relatively high value, for example, to a value that is high enough to allow low speed collisions, in which the operation of the occupant protection apparatuses is not required (for example, the broken line C1 shown in FIG. 3), to be excluded.

When a collision of a predetermined size is detected by the front crash sensor 11, a collision determining threshold value Gon-A/B1 (for example, the single dot chain line Gon-A/B1 shown in FIG. 3) that specifies whether an operation of an airbag apparatus is to be allowed or not allowed and a collision determining threshold value Gon-P/T1 (for example, the solid line Gon-P/T1 shown in FIG. 3) that specifies whether an operation of a seatbelt pretensioner is to be allowed or not allowed are set to values that specify that operations of the airbag apparatus and the seatbelt pretensioner are to be allowed in an area where at least the change in movement speed of an occupant ΔV or the amount of movement of the occupant ΔS is a lower value than for the collision determining threshold value Goff1 (for example, the dotted line Goff1 shown in FIG. 3), namely, are set to values that make it easier to allow operations of the airbag apparatus and the seatbelt pretensioner. Furthermore, the collision determining threshold value Gon-P/T1 (for example, the solid line Gon-P/T1 shown in FIG. 3) is set to a value that specifies that an operation of the seatbelt pretensioner is to be allowed in an area where at least the change in movement speed of an occupant ΔV or the amount of movement of the occupant ΔS is a lower value than for the collision determining threshold value Gon-A/B1 (for example, the single dot chain line Gon-A/B1 shown in FIG. 3), namely, to a value that makes an operation of the seatbelt pretensioner easier to allow than an operation of the airbag apparatus.

The SG determination processing section 29 sets, for a plurality of different occupant protection apparatuses such as, for example, airbags and seatbelt pretensioners, collision determination threshold values, which are boundary values of respective areas that specify whether an operation of a vehicle protection apparatus is allowed or not allowed, on an S-G MAP that shows a correlation between an amount of movement of an occupant ΔS and a change in acceleration ΔG (for example, rectangular coordinates that take the amount of movement of an occupant ΔS as the horizontal axis and the change in acceleration ΔG as the vertical axis) in accordance with whether or not a collision of a predetermined size is detected by the satellite sensors (for example, by the front crash sensors (L-FCS or R-FCS) 11). In addition, the SG determination processing section 29 determines for each occupant protection apparatus whether or not the correlation between the amount of movement of the occupant ΔSn that is input from the ΔSn calculation section for SV 24 and the change in acceleration ΔGn that is input from the ΔGn calculation section 26 exceeds a predetermined collision determination threshold value. When, for example, it is determined that the collision determination threshold value for a seatbelt pretensioner is exceeded, a P/T signal having a true value of "1" is output to the P/T AND circuit 32. When it is determined that the collision determination threshold value for an airbag apparatus is exceeded, an A/B signal having a true value of "1" is output to the A/B AND circuit 36.

For example, on the S-G MAP shown in FIG. 4, when a collision of a predetermined size is not detected by the front crash sensor 11, a collision determining threshold value Goff2 (for example, the dotted line Goff2 shown in FIG. 4) that specifies whether operations of an airbag apparatus and a seatbelt pretensioner are to be allowed or not allowed is set to a value that specifies that operations of the airbag apparatus and the seatbelt pretensioner are to be allowed in an area where at least the amount of movement of the occupant ΔS or the change in acceleration ΔG is a relatively high value, for example, is set to a value that is high enough to allow low speed collisions, in which the operation of the occupant protection apparatuses is not required (for example, the broken line C2 shown in FIG. 4), to be excluded.

When a collision of a predetermined size is detected by the front crash sensor 11, a collision determining threshold value Gon-A/B2 (for example, the single dot chain line Gon-A/B2 shown in FIG. 4) that specifies whether an operation of an airbag apparatus is to be allowed or not allowed and a collision determining threshold value Gon-P/T2 (for example, the solid line Gon-P/T2 shown in FIG. 4) that specifies whether an operation of a seatbelt pretensioner is to be allowed or not allowed are set to values that specify that operations of the airbag apparatus and the seatbelt pretensioner are to be allowed in an area where at least the change in movement speed of an occupant ΔV or the amount of movement of the occupant ΔS is a lower value than for the collision determining threshold value Goff2 (for example, the dotted line Goff2 shown in FIG. 4), namely, are set to values that make it easier to allow operations of the airbag apparatus and the seatbelt pretensioner. Furthermore, the collision determining threshold value Gon-P/T2 (for example, the solid line Gon-P/T2 shown in FIG. 4) is set to a value that specifies that an operation of the seatbelt pretensioner is to be allowed in an area where at least the change in movement speed of an occupant ΔV or the amount of movement of the occupant ΔS is a lower value than for the collision determining threshold value Gon-A/B2 (for example, the single dot chain line Gon-A/B2 shown in FIG. 4), namely, to a value that makes an operation of the seatbelt pretensioner easier to allow than an operation of the airbag apparatus.

The ΔVn determination section for SG 30 determines whether or not a change in movement speed of an occupant ΔVn that is calculated by the ΔVn calculation section for SG 27 is greater than a predetermined high side threshold value VTH_HI or low side threshold value VTH_LO that is selected by the ΔVn threshold value switching section 31. When the result of this determination is "YES", a guard signal having a true value of "1" is sent to the P/T AND circuit 32 and the A/B AND circuit 36, while when the result of this determination is "NO", a guard signal having a pseudo value of "0" is sent to the P/T AND circuit 32 and the A/B AND circuit 36.

The ΔVn threshold value switching section 31 selects, for example, the predetermined high side threshold value VTH_HI or low side threshold value VTH_LO shown in FIG. 5 in accordance with whether or not a collision of a predetermined size is detected by the satellite sensors (for example, the front crash sensors (L-FCS or R-FCS) 11), and sets them as threshold values to be referred to in determinations by the SGΔVn determination section 30.

For example, when a collision of a predetermined size is not detected by the front crash sensors 11, a high side threshold value VTH_HI that specifies that operations of an airbag apparatus and seatbelt pretensioner are to be allowed or not allowed is set to a value that is high enough to allow low speed collisions, in which the operation of the occupant protection apparatuses is not required (for example, the broken line C3 shown in FIG. 5), to be excluded.

Moreover, when a collision of a predetermined size is detected by the front crash sensors 11, a low side threshold value VTH_LO that specifies that operations of an airbag apparatus and seatbelt pretensioner are to be allowed or not allowed is set to a value that specifies that an operation of the seatbelt pretensioner is to be allowed in an area where the change in movement speed of an occupant ΔV is a lower value than for the high side threshold value VTH_HI, namely, to a value that makes it easier to allow operations of the airbag apparatus and the seatbelt pretensioner.

The P/T AND circuit 32 outputs as a P/T signal to the P/T OR circuit 33 a signal that is obtained from the logical product of a P/T signal output from the SG determination processing section 29 and a guard signal that is output from the ΔVn determination section for SG 30.

The P/T OR circuit 33 outputs as a P/T signal to the safing AND circuit 34 a signal that is obtained from the logical sum of a P/T signal that is output from the SV determination processing section 28 and a P/T signal that is output from the P/T AND circuit 32.

The safing AND circuit 34 outputs as a P/T signal to the P/T startup signal generating section 35 a signal that is obtained from the logical product of a P/T signal output from the P/T OR circuit 33 and a safing signal that is output from a mechanical or electronic type of safing sensor 10a that outputs safing signals having a true value of "1" when, for example, it detects an acceleration (or rate of deceleration) of a predetermined value or greater.

The P/T startup signal generating section 35 outputs, in accordance with a P/T signal that is output from the safing AND circuit 34, a command signal that causes a seatbelt pretensioner to be operated.

The A/B AND circuit 36 outputs as an A/B signal to the A/B OR circuit 37 a signal that is obtained from the logical product of an A/B signal output from the SG determination processing section 29 and a guard signal that is output from the ΔVn determination section for SG 30.

The A/B OR circuit 33 outputs as an A/B signal to the safing AND circuit 38 a signal that is obtained from the logical sum of an A/B signal that is output from the SV determination processing section 28 and an A/B signal that is output from the A/B AND circuit 36.

The safing AND circuit 38 outputs as an A/B signal to the A/B startup signal generating section 39 a signal that is obtained from the logical product of an A/B signal output from the A/B OR circuit 37 and a safing signal that is output from a mechanical or electronic type of safing sensor 10a that outputs safing signals having a true value of "1" when, for example, it detects an acceleration (or rate of deceleration) of a predetermined value or greater.

The A/B startup signal generating section 39 outputs, in accordance with a A/B signal that is output from the safing AND circuit 38, a command signal that causes an airbag apparatus to be operated.

The collision determining apparatus for a vehicle 10 according to the present embodiment has the above described structure. Next, a description will be given of the operation of the collision determining apparatus for a vehicle 10, and, in particular, of processing to set, in accordance with acceleration signals that are output from the front crash sensors 11, the respective collision determining threshold values on an S-V MAP that shows a correlation between a change in movement speed of an occupant ΔV and an amount of movement of an occupant ΔS and on an S-G MAP that shows a correlation between an amount of movement of an occupant ΔS and a change in acceleration ΔG Note that the processing for an S-V MAP in steps S01 to S08 and the processing for an S-G MAP in steps S11 to S22 are executed in parallel independently from each other.

Figure 6:
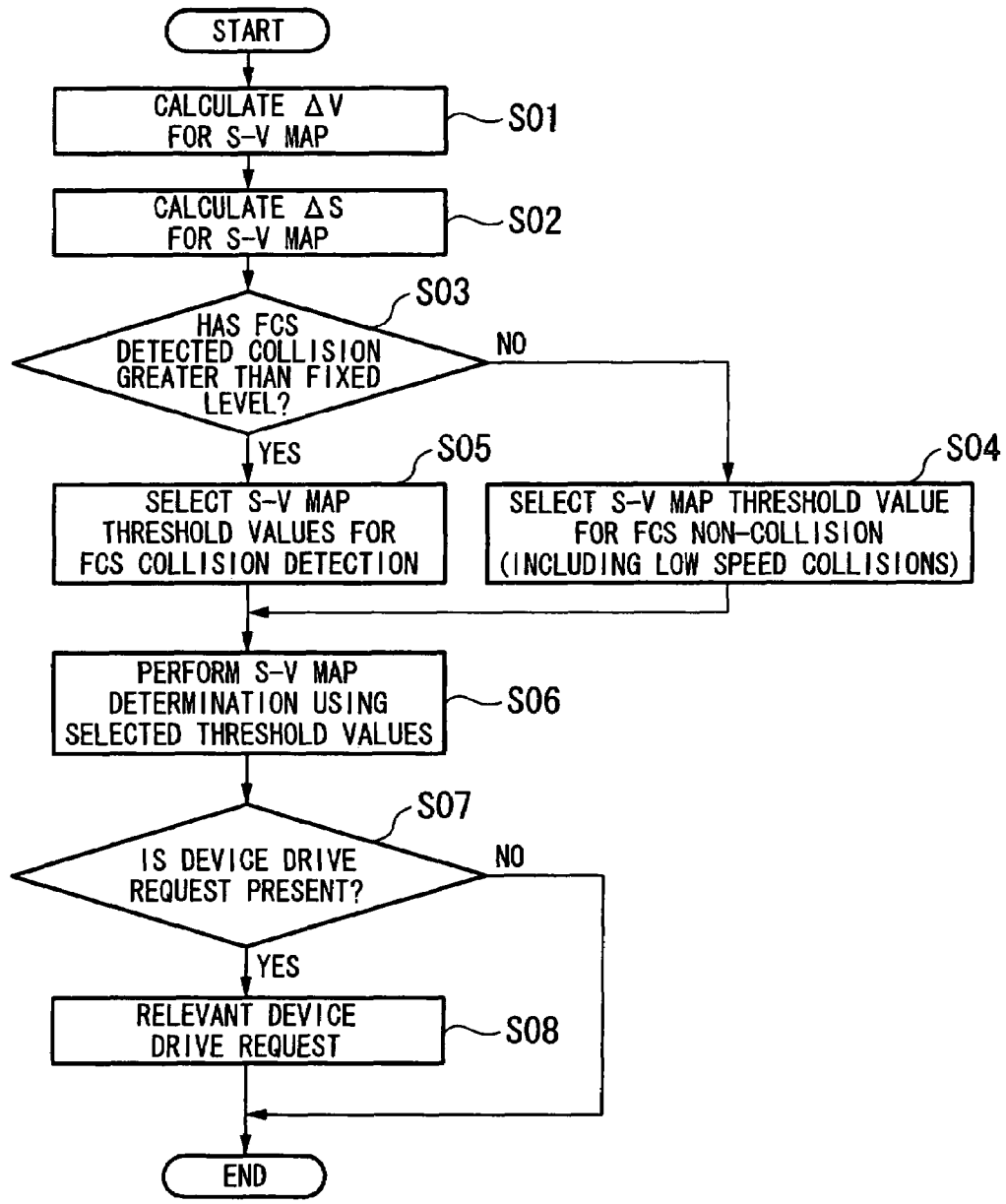
FIG. 6 is a flowchart showing processing to set collision determining threshold values on an S-V MAP.

Firstly, in step S01 shown in FIG. 6, primary integration for time is performed on the acceleration signals G, As shown in Formula (1) above, and a change in movement speed of an occupant ΔVn in a time interval having a predetermined time width n relative to the current time tp (i.e., tp−n≦t≦tp) is calculated.

Next, in step S02, secondary integration for time is performed on the acceleration signals G, As shown in Formula (2) above, and an amount of movement of an occupant ΔSn in a time interval having a predetermined time width n relative to the current time tp (i.e., tp−n≦t≦tp) is calculated.

Next, in step S03, a determination is made as to whether or not a collision is detected in which an integral value ΔVFCS obtained by performing the primary integration for time on the acceleration signals output from the front crash sensors 11 is equal to or greater than a predetermined threshold value #ΔVFCS.

Figure 7:
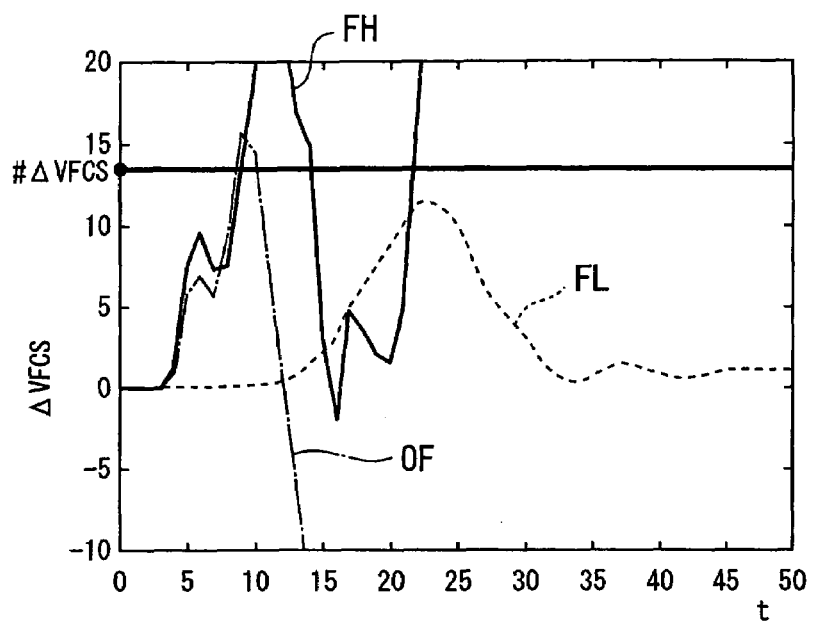
FIG. 7 is a view showing an example of a threshold value $\#\Delta V_{FCS}$ for an integral value $\Delta V_{FCS}$ that is obtained by performing primary integration for time on acceleration signals output from a front crash sensor.
Figure 8:
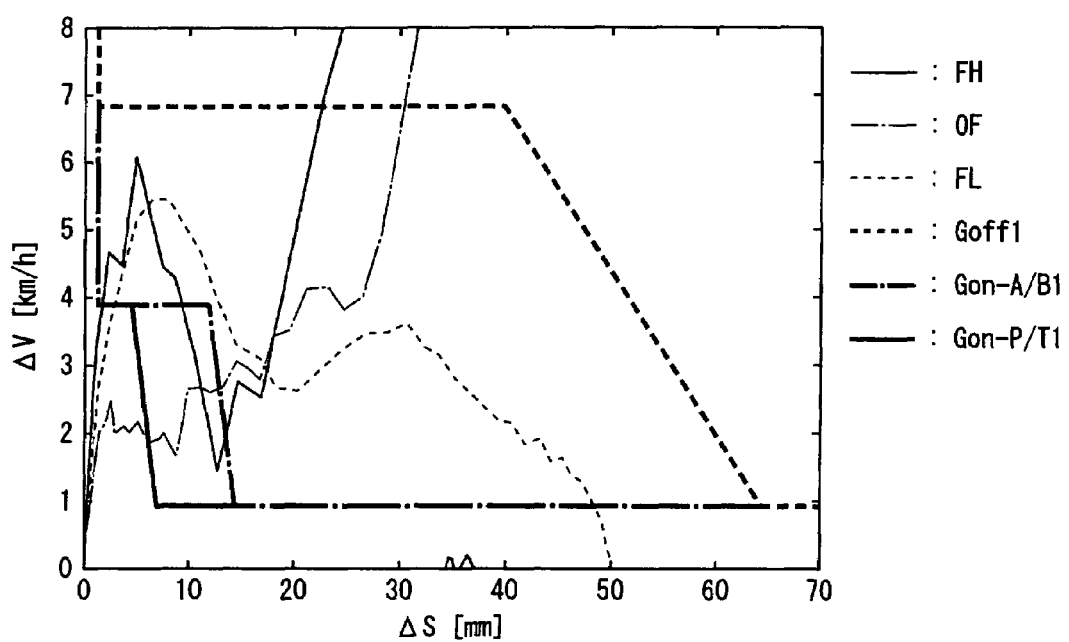
FIG. 8 is a view showing an example of collision determining threshold values on an S-V MAP.

When the result of this determination is "YES", for example, when a collision such as a frontal high speed collision FH or a high speed offset collision OF (for example, the solid line FH and the single dot chain line OF shown in FIG. 7) is detected, the routine moves to step S05 (described below).

When, however, the result of the determination is "NO", for example, when a collision such as a low speed collision FL (for example, the broken line FL shown in FIG. 7) is detected, the routine moves to step S04.

In step S04, the collision determining threshold value Goff1 (for example, the broken line Goff1 shown in FIG. 8) that specifies whether an operation of the airbag apparatus and the seatbelt pretensioner is to be allowed or not allowed when a collision of a predetermined size is not detected by the front crash sensors 11 is selected as a collision determining threshold value on an S-V MAP (i.e., an S-V MAP threshold value), and the routine moves to step S06 (described below).

In step S05, the collision determining threshold value Gon-A/B1 (for example, the single dot chain line Gon-A/B1 shown in FIG. 8) that specifies whether an operation of the airbag apparatus is to be allowed or not allowed when a collision of a predetermined size is detected by the front crash sensors 1, and the collision determining threshold value Gon-P/T1 (for example, the solid line Gon-P/T1 shown in FIG. 8) that specifies whether an operation of the seatbelt pretensioner is to be allowed or not allowed when a collision of a predetermined size is detected by the front crash sensors 11 are selected as collision determining threshold values on an S-V MAP (i.e., S-V MAP threshold values), and the routine moves to step S06.

In step S06, a determination is made for each occupant protection apparatus as to whether or not the correlation on the S-V MAP between the change in movement speed of an occupant ΔVn input from the ΔVn calculation section for SV 23 and the amount of movement of the occupant ΔSn input from the ΔSn calculation section for SV 24 exceeds the selected collision determining threshold values.

In step S07, a determination is made as to whether or not a drive request is generated for each occupant protection apparatus (DEVICE) in accordance with the result of the determination in step S06.

When the result of this determination is "NO", the processing sequence is ended.

When, however, the result of this determination is "YES", the routine moves to step S08, and a drive request is output to the occupant protection apparatus for which it was determined that the correlation on the S-V MAP between the change in movement speed of an occupant ΔVn and the amount of movement of the occupant ΔSn exceeds the collision determining threshold value. The processing sequence is then ended.

Figure 9:
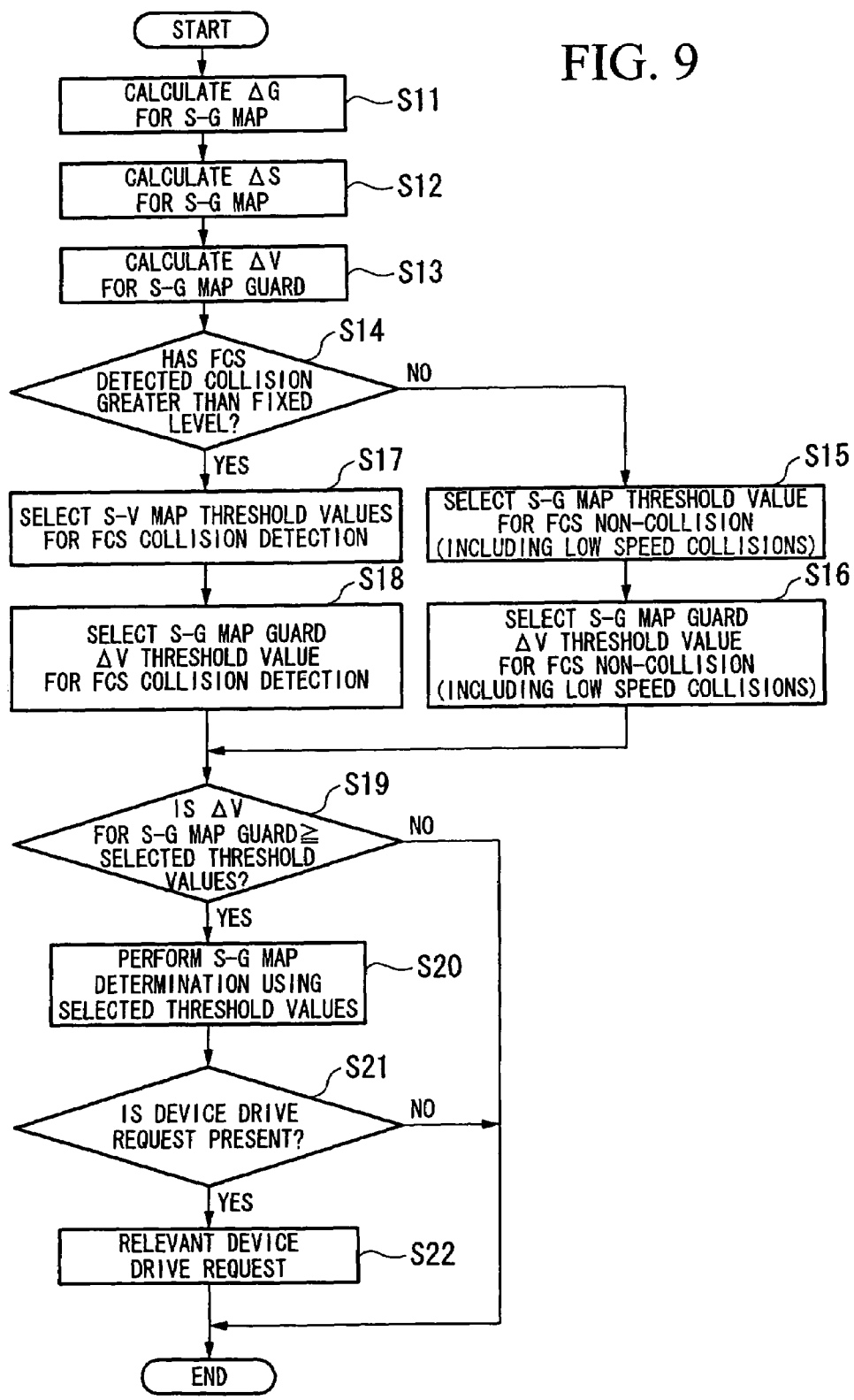
FIG. 9 is a flowchart showing processing to set collision determining threshold values on an S-G MAP.
Figure 10:
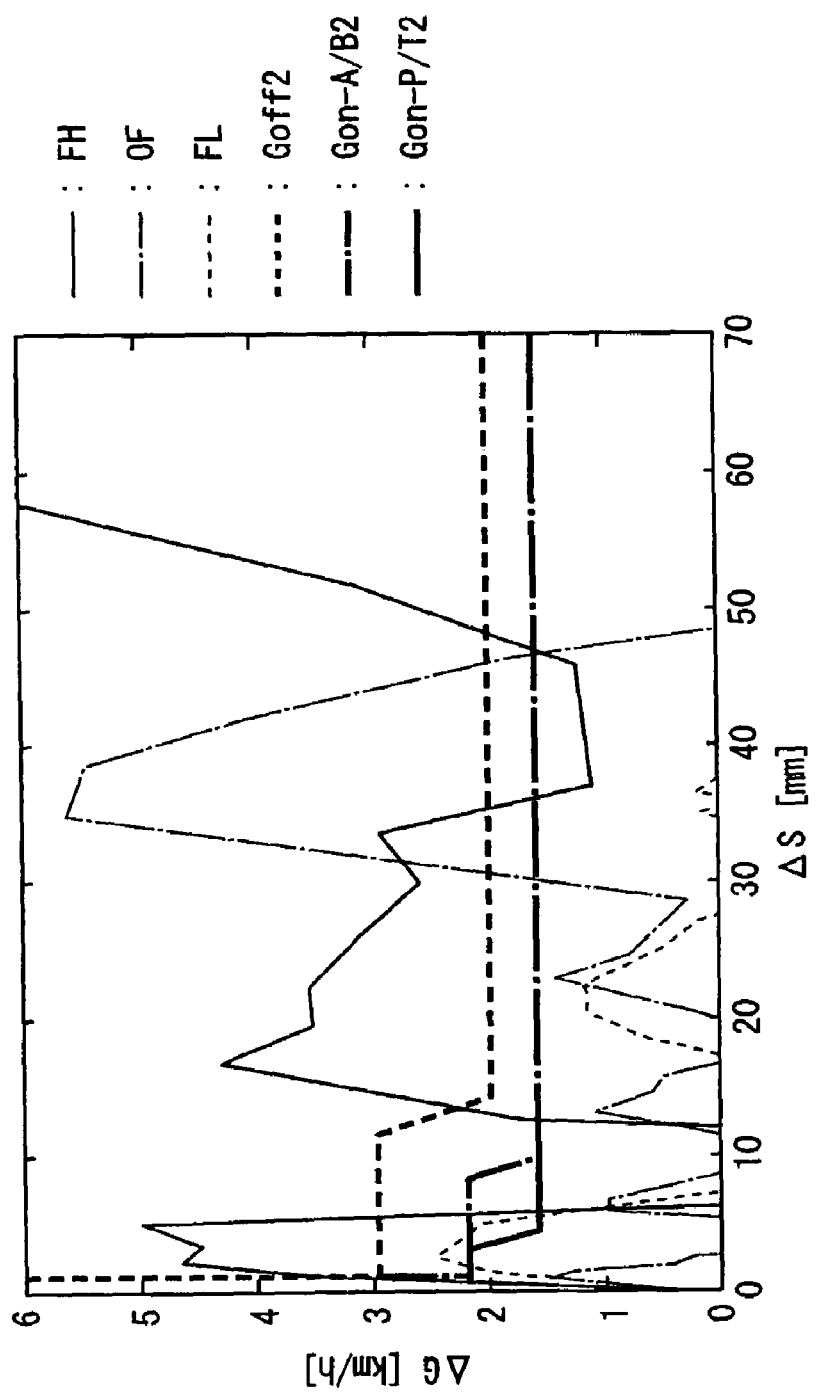
FIG. 10 is a view showing an example of collision determining threshold values on an S-G MAP.

In step S11 shown in FIG. 9, primary integration for time is performed on the acceleration signals G, As shown in Formula (3) above, and a difference between respective integral values (i.e., a change in acceleration) ΔGn in time intervals having different predetermined time widths n relative to the current time tp (i.e., tp−2n≦t≦tp−n and tp−n≦t≦tp) is calculated, namely, a temporal change in the integral values is calculated.

Next, in step S12, secondary integration for time is performed on the acceleration signals G, As shown in Formula (2) above, and an amount of movement of an occupant ΔSn in a time interval having a predetermined time width n relative to the current time tp (i.e., tp−n≦t≦tp) is calculated.

Next, in step S13, primary integration for time is performed on the acceleration signals G, As shown in Formula (1) above, and a change in movement speed of an occupant ΔVn in a time interval having a predetermined time width n relative to the current time tp (i.e., tp−n≦t≦tp) is calculated.

Next, in step S114, a determination is made as to whether or not a collision is detected in which an integral value ΔVFCS obtained by performing the primary integration for time on the acceleration signals output from the front crash sensors 11 is equal to or greater than a predetermined threshold value #ΔVFCS.

When the result of this determination is "YES", for example, when a collision such as a frontal high speed collision FH or a high speed offset collision OF (for example, the solid line FH and the single dot chain line OF shown in FIG. 7) is detected, the routine moves to step S17 (described below).

When, however, the result of the determination is "NO", for example, when a collision such as a low speed collision FL (for example, the broken line FL shown in FIG. 7) is detected, the routine moves to step S115.

In step S15, the collision determining threshold value Goff2 (for example, the broken line Goff2 shown in FIG. 10) that specifies whether an operation of the airbag apparatus and the seatbelt pretensioner is to be allowed or not allowed when a collision of a predetermined size is not detected by the front crash sensors 11 is selected as a collision determining threshold value on an S-G MAP (i.e., as an S-G MAP threshold value).

Next, in step S16, the high side threshold value VTH_HI that specifies whether an operation of the airbag apparatus and the seatbelt pretensioner is to be allowed or not allowed when a collision of a predetermined size is not detected by the front crash sensors 11 is selected as a collision determining threshold value for the change in movement speed of an occupant $\Delta V$ (i.e., an S-G MAP guard $\Delta V$ threshold value), and the routine moves to step S19 (described below).

In step S17, the collision determining threshold value Gon-A/B2 (for example, the single dot chain line Gon-A/B2 shown in FIG. 10) that specifies whether an operation of the airbag apparatus is to be allowed or not allowed when a collision of a predetermined size is detected by the front crash sensors 11, and the collision determining threshold value Gon-P/T2 (for example, the solid line Gon-P/T2 shown in FIG. 10) that specifies whether an operation of the seatbelt pretensioner is to be allowed or not allowed when a collision of a predetermined size is detected by the front crash sensors 11 are selected as collision determining threshold values on an S-G MAP (i.e., as S-G MAP threshold values).

Next, in step S18, the low side threshold value VTH_LO that specifies whether an operation of the airbag apparatus is to be allowed or not allowed when a collision of a predetermined size is detected by the front crash sensors 11 is selected as a collision determining threshold value for the change in movement speed of an occupant $\Delta V$ (i.e., an S-G MAP guard $\Delta V$ threshold value), and the routine moves to step S19.

A determination is then made as to whether or not the change in movement speed of an occupant $\Delta Vn$ input from the $\Delta Vn$ calculation section for SG 27 is greater than the selected predetermined high side threshold value VTH_HI or low side threshold value VTH_LO.

When the result of this determination is "NO", the processing sequence is ended.

When, however, the result of this determination is "YES", the routine moves to step S20.

In step S20, a determination is made for each occupant protection apparatus as to whether or not the correlation on the S-G MAP between the amount of movement of the occupant $\Delta Sn$ input from the $\Delta Sn$ calculation section for SV 24 and the change in acceleration $\Delta Gn$ input from the $\Delta Gn$ calculation section 26 exceeds the respective collision determining threshold values selected.

In step S21, a determination is made as to whether or not a drive request is generated for each occupant protection apparatus (DEVICE) in accordance with the result of the determination in step S20.

When the result of this determination is "NO", the processing sequence is ended.

When, however, the result of this determination is "YES", the routine moves to step S22, and a drive request is output to the occupant protection apparatus for which it was determined that the correlation on the S-G MAP between the amount of movement of the occupant $\Delta Sn$ and the change in acceleration $\Delta Gn$ exceeds the collision determining threshold value. The processing sequence is then ended.

As described above, according to the collision determining apparatus for a vehicle 10 of the present embodiment, by setting the collision determining threshold values Goff1 and Goff2 that specify whether operations of the airbag apparatus and seatbelt pretensioner are to be allowed or not allowed when a collision of a predetermined size is not detected by the front crash sensors 11 to a value that is high enough to enable low speed collisions, in which the occupant protection apparatuses do not need to be operated, to be excluded, it is possible to prevent the occupant protection apparatuses from being started up unnecessarily. Moreover, by setting the collision determining threshold values Gon-A/B1, Gon-A/B2, Gon-P/T1, and Gon-P/T2 to values that make it easier to allow operations of an airbag apparatus and seatbelt pretensioner when a collision of a predetermined size is detected by the front crash sensors 11, then even if the collision is a high speed collision, it is possible to shorten the time required from the collision occurrence until the collision determination, and the occupant protection apparatuses can be operated at the appropriate timings. Furthermore, by setting the respective collision determining threshold values Gon-A/B1, Gon-A/B2, Gon-P/T1, and Gon-P/T2 for each of a plurality of occupant protection apparatuses, it is possible to restrain an occupant in the initial stages of a collision by first operating a seatbelt pretensioner and to then raise the level of protection of the occupant by causing an airbag apparatus to be operated subsequently.

Furthermore, by determining on an S-G MAP that shows a correlation between an amount of movement of an occupant $\Delta S$ and a change in acceleration $\Delta G$ whether or not a correlation between an amount of movement of an occupant $\Delta Sn$ and a change in acceleration $\Delta Gn$ exceeds a collision determining threshold value for each occupant protection apparatus, it is possible to determine the severity of a collision which is occurred and the state of continuation of this collision. Moreover, by determining whether or not the change in movement speed of an occupant $\Delta Vn$, in which, compared with the change in acceleration $\Delta Gn$, for example, vibration and the like are suppressed and the change is relatively smooth, is greater than a predetermined high side threshold value VTH_HI or low side threshold value VTH_LO, it is possible to judge the stability and reliability of a collision determination and the occupant protection apparatuses can be made to operate even more appropriately.

Note that, in the above described embodiment, an airbag apparatus and a seatbelt pretensioner are driven and controlled to serve as occupant protection apparatuses, however, the present invention is not limited to this and it is also possible to drive and control seat devices whose seat position and configuration and the like are capable of being altered.

In the above described embodiment, the $\Delta Vn$ calculation section for SG 27 performs a primary integration on the acceleration signals G using the same time width n as that in the $\Delta Gn$ calculation section 26, however, the present invention is not limited to this, and it is also possible, for example, to calculate a change in movement speed of an occupant $\Delta Vn$ in a time period (i.e., tp−m≦t≦tp) having a longer time width m (i.e., >n) than the time width n in the $\Delta Gn$ calculation section 26, and then output the result to the $\Delta Vn$ determination section for SG 30. In this case, even if a vibration component is superimposed on the acceleration signals G, it is still possible to even further improve the stability of the collision determination using a change in movement speed of an occupant $\Delta Vm$ that is obtained by performing primary integration on the acceleration signals G in a time period having a time width m that is longer than the wavelength of this vibration component.

Moreover, in each of the above described embodiments, a collision determining threshold value is set on an S-V MAP and on an S-G MAP for each one of a plurality of different occupant protection apparatuses, however, the present invention is not limited to this, and it is also possible to set the same collision determining threshold value for of a plurality of different occupant protection apparatuses.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A collision determining apparatus for a vehicle having an air-bag apparatus and a seatbelt-pretensioner, comprising:
   a first acceleration measuring device configured to measure an acceleration acting on an outer peripheral portion of the vehicle;
   a second acceleration measuring device configured to measure an acceleration acting on a position further to an inner portion side of the vehicle than the first acceleration measuring device;
   a first movement amount calculating device configured to calculate a distance of movement of an occupant based on the acceleration which is measured by the second acceleration measuring device;
   a first change in movement speed calculating device configured to calculate a change in movement speed of the occupant based on the acceleration which is measured by the second acceleration measuring device;
   a first collision-determining threshold-value-setting device configured to set at least first collision determining threshold values for a correlation between the distance of movement of the occupant and the change in movement speed of the occupant based on the acceleration which is measured by the first acceleration measuring device so that operation for the seatbelt pretensioner is facilitated more than operation for the air-bag apparatus when a predetermined significance of collision is detected by the first acceleration measuring device, the first collision determining threshold values are different between the air-bag apparatus and the seatbelt pretensioner;
   a first collision-determining device configured to determine whether or not the correlation exceeds the first collision determining threshold value;
   a change in acceleration calculating device configured to calculate a change in acceleration based on the acceleration which is measured by the second acceleration measuring device;
   a second collision-determining threshold-value-setting device configured to set at least second collision determining threshold values for a correlation between the distance of movement of the occupant and the change in acceleration based on the acceleration which is measured by the first acceleration measuring device, the second collision determining threshold values are different between the air-bag apparatus and the seatbelt pretensioner;
   a second collision-determining device configured to determine whether or not the correlation exceeds the collision determining threshold value; and
   a control signal generating device configured to generate a control signal which controls operations of an occupant protection apparatus, in accordance with a result of a determination by the first and second collision determining devices and a safing signal that is put out from a safing sensor which detects an acceleration having a predetermined value or greater,
   wherein second collision-determining threshold-value-setting device sets the second collision determining threshold values that are different between the air-bag apparatus and the seatbelt pretensioner so that operation for the seatbelt pretensioner is facilitated more than operation for the air-bag apparatus when the predetermined significance of collision is detected by the first acceleration measuring device.

2. The collision determining apparatus for a vehicle according to claim 1, wherein the first collision determining threshold value setting device is configured to set a different collision determining threshold value for each one of a plurality of the occupant protection apparatuses.

3. A collision determining apparatus for a vehicle having an air-bag apparatus and a seat-pretensioner, comprising:
   a first acceleration measuring device configured to measure an acceleration acting on an outer peripheral portion of the vehicle;
   a second acceleration measuring device configured to measure an acceleration acting on a position further to an inner portion side of the vehicle than the first acceleration measuring device;
   a movement amount calculating device configured to calculate a distance of movement of an occupant based on the acceleration which is measured by the second acceleration measuring device;
   a change in acceleration calculating device configured to calculate a change in acceleration based on the acceleration which is measured by the second acceleration measuring device;
   a collision-determining threshold-value-setting device configured to set at least collision determining threshold values for a correlation between the distance of movement of the occupant and the change in acceleration based on the acceleration which is measured by the first acceleration measuring device, the collision determining threshold values are different between the air-bag apparatus and the seatbelt pretensioner;
   a collision-determining device configured to determine whether or not the correlation exceeds the collision determining threshold value; and
   a control signal generating device configured to generate a control signal which controls operations of an occupant protection apparatus, in accordance with a result of a determination by the second collision determining device and a safing signal that is put out from a safing sensor which detects an acceleration having a predetermined value or greater,
   wherein the collision-determining threshold-value-setting device sets the collision determining threshold values that are different between the air-bag apparatus and the seatbelt pretensioner so that operation for the seatbelt pretensioner is facilitated more than operation for the air-bag apparatus when a predetermined significance of collision is detected by the first acceleration measuring device.

4. The collision determining apparatus for a vehicle according to claim 3, wherein the second collision determining threshold value setting device is configured to set a different collision determining threshold value for each one of a plurality of the occupant protection apparatuses.

5. The collision determining apparatus for a vehicle according to claim 3, further comprising:
   a change in movement speed calculating device configured to calculate a change in movement speed of the occupant based on the acceleration which is measured by the second acceleration measuring device; and a collision stability determining device configured to determine whether or not the change in movement speed of the occupant is larger than a predetermined threshold value, wherein the control signal generating device is configured to generate a control signal which controls operations of an occupant protection apparatus in accordance with a result of a determination by the second collision determining device, and the safing signal that is put out from the safing sensor, and a result of a determination by the collision stability determining device.

6. The collision determining apparatus for a vehicle according to claim 5, further comprising:

a collision determining area setting device configured to set the predetermined threshold value based on the acceleration which is measured by the first acceleration measuring device.

7. The collision determining apparatus for a vehicle according to claim 1, further comprising:

an airbag apparatus and a seatbelt pretensioner, wherein the collision determining threshold values correspond to:

a collision determining threshold value configured to specify whether operations of an airbag apparatus and a seatbelt pretensioner are to be allowed or not allowed;

a collision determining threshold value configured to specify whether an operation of an airbag apparatus is to be allowed or not allowed; and a collision determining threshold value configured to specify whether an operation of a seatbelt pretensioner is to be allowed or not allowed.

8. The collision determining apparatus for a vehicle according to claim 3, further comprising:

an airbag apparatus and a seatbelt pretensioner, wherein the collision determining threshold values correspond to:

a collision determining threshold value configured to specify whether operations of an airbag apparatus and a seatbelt pretensioner are to be allowed or not allowed;

a collision determining threshold value configured to specify whether an operation of an airbag apparatus is to be allowed or not allowed; and a collision determining threshold value configured to specify whether an operation of a seatbelt pretensioner is to be allowed or not allowed.

* * * * *